United States Patent
Igarashi et al.

(10) Patent No.: US 12,353,652 B2
(45) Date of Patent: Jul. 8, 2025

(54) COORDINATE OUTPUT DEVICE, PEN-SHAPED DEVICE, AND ELECTRONIC EQUIPMENT

(71) Applicant: Wacom Co., Ltd., Saitama (JP)

(72) Inventors: Gen Igarashi, Saitama (JP); Jun Kadowaki, Saitama (JP); Masayuki Miyamoto, Saitama (JP); Hideki Fujimaki, Saitama (JP); Tsukasa Nomi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/493,627

(22) Filed: Oct. 24, 2023

(65) Prior Publication Data
US 2024/0053837 A1 Feb. 15, 2024

Related U.S. Application Data

(63) Continuation of application No. PCT/JP2022/018409, filed on Apr. 21, 2022.

(30) Foreign Application Priority Data

Apr. 30, 2021 (JP) ................. 2021-077298

(51) Int. Cl.
*G06F 3/0354* (2013.01)
*G06F 3/03* (2006.01)
*G06F 3/041* (2006.01)

(52) U.S. Cl.
CPC ........ *G06F 3/03545* (2013.01); *G06F 3/0317* (2013.01); *G06F 3/03542* (2013.01); *G06F 3/04162* (2019.05)

(58) Field of Classification Search
None
See application file for complete search history.

(56) References Cited

U.S. PATENT DOCUMENTS

2003/0112220 A1  6/2003  Yang et al.
2006/0012562 A1*  1/2006  Pope .................. G06F 3/03543
                                                              345/156

(Continued)

FOREIGN PATENT DOCUMENTS

JP  H10333817 A  12/1998
JP  2004086462 A  3/2004

(Continued)

OTHER PUBLICATIONS

English translation of International Search Report, mailed Jul. 19, 2022, for PCT Patent Application No. PCT/JP2022/018409. (2 pages).

(Continued)

*Primary Examiner* — Christopher J Kohlman
(74) *Attorney, Agent, or Firm* — Seed IP Law Group LLP

(57) ABSTRACT

Disclosed herein is a coordinate output device that outputs absolute coordinates indicating a position in a predetermined region or relative coordinates, according to a position indicated by a position indicator. The coordinate output device continues to output the relative coordinates while the absolute coordinates are not acquired, and starts output of the absolute coordinates and stops the output of the relative coordinates in response to acquisition of the absolute coordinates.

14 Claims, 4 Drawing Sheets

(56) References Cited

U.S. PATENT DOCUMENTS

2007/0114367 A1     5/2007  Craven-Bartle et al.
2011/0234549 A1     9/2011  Matsumoto

FOREIGN PATENT DOCUMENTS

| JP | 2004516542 A | 6/2004 |
| JP | 2006031709 A | 2/2006 |
| JP | 2007524155 A | 8/2007 |
| JP | 2011204173 A | 10/2011 |
| JP | 2013045206 A | 3/2013 |
| JP | 2013134669 A | 7/2013 |

OTHER PUBLICATIONS

Goocho, "What is a pen-type mouse? 14 recommended and popular selections. Can it be used for illustrations?," Published Nov. 30, 2022, downloaded Sep. 26, 2023, URL: https://goocho.jp/6527. (54 pages).

* cited by examiner

F I G . 3
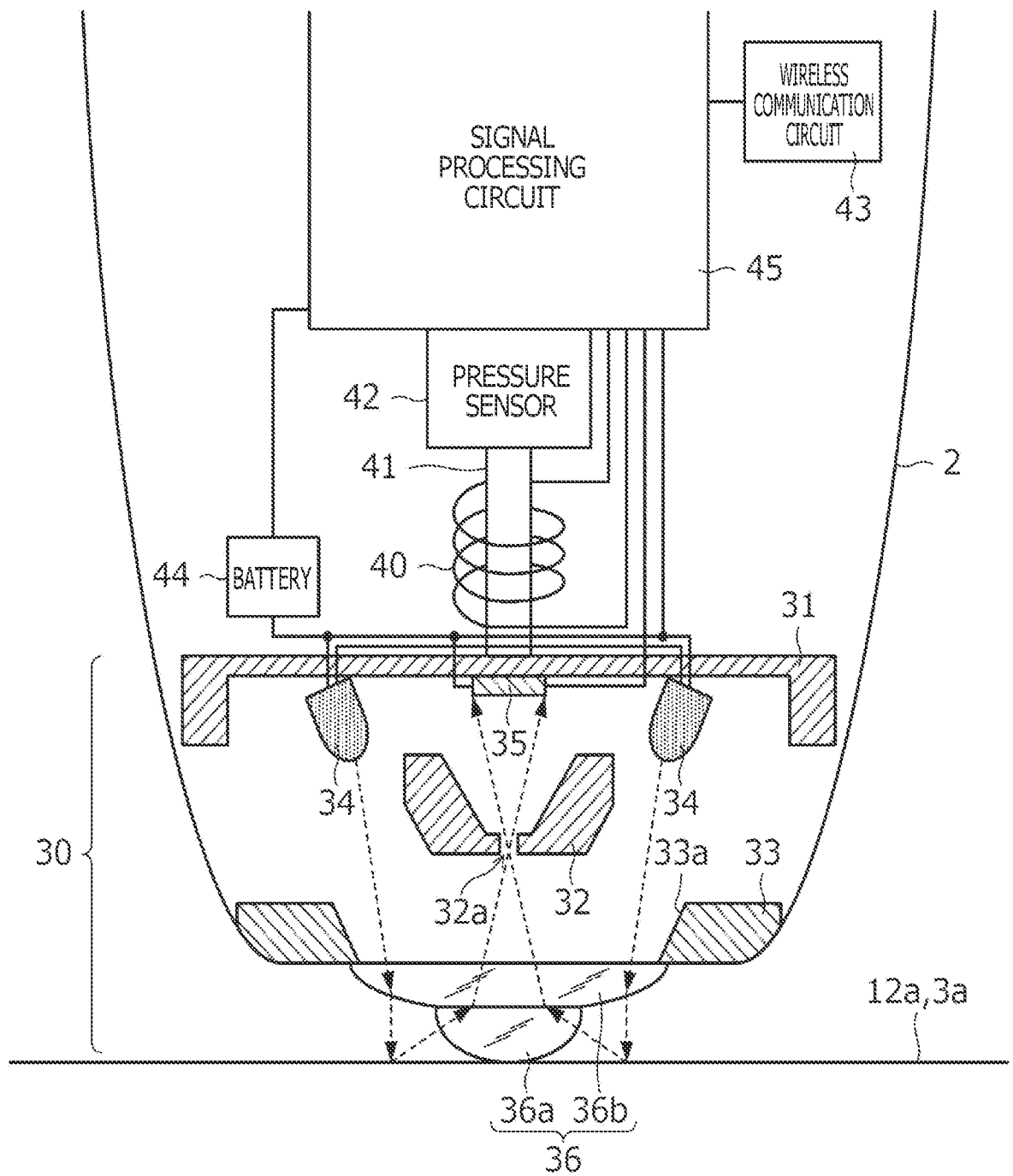

COORDINATE OUTPUT DEVICE, PEN-SHAPED DEVICE, AND ELECTRONIC EQUIPMENT

BACKGROUND

Technical Field

The present disclosure relates to a coordinate output device, a pen-shaped device, and electronic equipment.

Description of the Related Art

Conventionally, a "mouse" that is peripheral equipment of a computer is made in imitation of the shape of a mouse that is an animal, and therefore is referred to as a "mouse." However, in recent years, a mouse with a pen shape has come into existence. The pen-shaped mouse has a shape of a pen that is thin and long and is easy to hold, and it is thus considered that the pen-shaped mouse allows space saving and imposes a small burden on a human body at the time of operation compared with the existing mouse with the animal mouse-like shape.

Examples of the pen-shaped mouse are disclosed in Japanese Patent Laid-open No. 2004-086462 (hereinafter referred to as Patent Document 1), Published Japanese Translations of PCT International Publications for Patent Application Nos. 2007-524155 and 2004-516542, and "Tsukaiyasui Pengata Mouse no Osusume 10 Sen. Bluetooth (registered trademark) Taiou Nado (in English, recommended 10 selections of easy-to-use pen-shaped mouse. Bluetooth (registered trademark)-compatible product and so forth)," [online], Apr. 15, 2020, TTS Ltd., [searched on Apr. 26, 2021], the Internet <URL: https://goocho.jp/6527>. These pen-shaped mice are all an optical system and are configured to image a reading surface by an imaging element in the state in which the reading surface is irradiated with light from a light source, and to detect the movement amount from a pattern or the like included in the imaging result.

Further, in Japanese Patent Laid-open No. 2013-045206 (hereinafter referred to as Patent Document 2), an electronic pen having a remaining level display part for displaying the remaining capacity of a built-in battery is disclosed.

BRIEF SUMMARY

Basically, a mouse is used in order to move a cursor displayed on a screen. In some applications, it is also possible to use the mouse for inputting stroke data. However, the input of stroke data by the mouse is low in accuracy compared with input by an electronic pen compatible with the electromagnetic induction system or the active capacitive system. Hence, conventionally, even when the pen-shaped mouse is used, the user needs to switch the pen-shaped mouse to the electronic pen and hold the electronic pen when stroke data needs to be input with high accuracy.

Therefore, one of objects of the present disclosure is to provide a coordinate output device and a pen-shaped device that can implement input of stroke data by a pen-shaped mouse with high accuracy.

Further, in the pen-shaped mouse described in Patent Document 1, a waveguide that guides light from the light source to the reading surface and a waveguide that guides light reflected by the reading surface to the imaging element are configured with use of a common lens. According to this configuration, there is no need to irradiate the pen tip with light from a lateral direction, and the pen-shaped mouse can thus be implemented with a simple configuration. Meanwhile, the light from the light source converges on one point, and there is a problem that the imaging range becomes small.

Therefore, another one of objects of the present disclosure is to provide a pen-shaped device that can implement a wide imaging range while waveguides of forward and return paths are configured with a common lens.

Moreover, in the existing electronic pen, decrease in the capacity of a built-in battery is informed to the user by displaying the remaining level as in the electronic pen described in Patent Document 2. However, the user frequently overlooks the display, and an improvement is required.

Therefore, still another one of objects of the present disclosure is to provide electronic equipment that can notify the user of the remaining level of a built-in battery by a method that allows the user to perceive the remaining level more easily.

A coordinate output device according to a first aspect of the present disclosure is a coordinate output device that includes at least one processor, and at least one memory storing instructions that, when executed by the at least one processor, cause the coordinate output device to output absolute coordinates indicating a position in a predetermined region or relative coordinates, according to a position indicated by a position indicator. The instructions, when executed by the at least one processor, cause the coordinate output device to continue to output the relative coordinates while the absolute coordinates are not acquired, and start output of the absolute coordinates and stop output the relative coordinates in response to acquisition of the absolute coordinates.

A pen-shaped device according to the first aspect of the present disclosure is a pen-shaped device having a pen tip, the pen-shaped device including a relative coordinate detecting circuit that, in operation, detects relative coordinates indicating change in the position of the pen tip and a signal transmitter circuit that transmits a signal used for detection of absolute coordinates of the pen tip in a predetermined region.

A pen-shaped device according to a second aspect of the present disclosure is a pen-shaped device having a pen tip, the pen-shaped device including a relative coordinate detecting device that, in operation, detects relative coordinates indicating change in the position of the pen tip. The relative coordinate detecting device includes an optical device including a light source that, in operation, emits light and an imaging part that, in operation, images reflected light of the light emitted from the light source. The optical device includes a waveguide component that, in operation, diffuses the light to a vicinity of the pen tip and a function of guiding the reflected light to the imaging part.

An electronic device according to a third aspect of the present disclosure, which is used together with a pen-shaped device having a pen tip, the pen-shaped device including a relative coordinate detecting circuit that detects relative coordinates indicating change in a position of the pen tip and a signal transmitter that transmits a signal used for detection of absolute coordinates of the pen tip in a predetermined region, and includes at least one processor, and at least one memory storing instructions that, when executed by the at least one processor, cause the electronic device to: acquire absolute coordinates indicating the position of a pen-shaped device in a predetermined region based on a signal transmitted from a signal transmitter of the pen-shaped device.

The signal transmitted from the signal transmitter includes battery remaining level information indicating the remaining level of a battery incorporated in the pen-shaped device. The electronic equipment adds the battery remaining level information to a writing log together with the absolute coordinates. The electronic equipment generates stroke data based on a series of the absolute coordinates included in the writing log and executes rendering of the generated stroke data based on a series of the battery remaining level information included in the writing log.

According to the first aspect of the present disclosure, it is possible to output the absolute coordinates from the coordinate output device when the position indicated by the pen-shaped device, which is one kind of the position indicator, exists in the predetermined region, while outputting the relative coordinates from the coordinate output device when the position exists outside the predetermined region. Therefore, it is possible to implement input of the stroke data by the pen-shaped mouse with high accuracy.

According to the second aspect of the present disclosure, the waveguide component is configured to diffuse the light emitted from the light source to the vicinity of the pen tip. Therefore, it is possible to implement a wide imaging range while configuring the waveguides of forward and return paths with a common lens.

According to the third aspect of the present disclosure, the battery remaining level can be reflected in the rendering result of the stroke data. Therefore, it is possible to notify the user of the remaining level of the built-in battery by a method that allows the user to perceive the remaining level more easily.

BRIEF DESCRIPTION OF THE SEVERAL VIEWS OF THE DRAWINGS

FIG. 3 is a schematic diagram illustrating a cross section of a vicinity of a pen tip of a pen-shaped device illustrated in FIG. 1;

DETAILED DESCRIPTION

A preferred embodiment of the present disclosure will be described in detail below with reference to the accompanying drawings.

Figure 1:
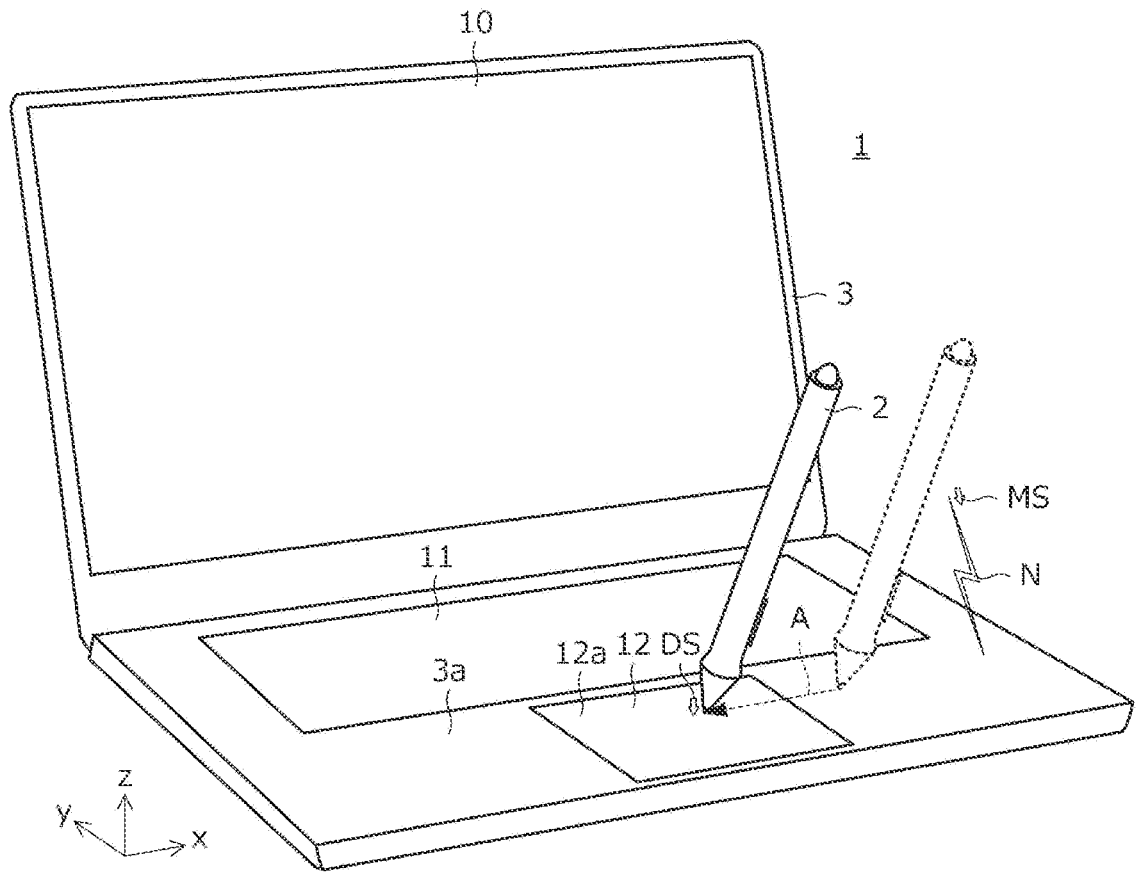
FIG. 1 is a diagram illustrating a configuration of a position detection system according to an embodiment of the present disclosure.

FIG. 1 is a diagram illustrating a configuration of a position detection system 1 according to the embodiment of the present disclosure. As illustrated in this diagram, the position detection system 1 includes a pen-shaped device 2 and electronic equipment 3 that is a position detection device configured to detect the pen-shaped device 2.

The pen-shaped device 2 is a device with a pen shape having a pen tip and plays a role as a position indicator that indicates a position to the electronic equipment 3. As described in detail later, the pen-shaped device 2 has a function of detecting relative coordinates indicating change in the position of the pen tip and a function of transmitting a downlink signal DS for causing the electronic equipment 3 to detect absolute coordinates indicating the position of the pen tip in a predetermined region (specifically, touch surface 12a). Further, the pen-shaped device 2 also has a function of transmitting a mouse signal MS indicating the detected relative coordinates, by using short-range wireless communication N such as Bluetooth (registered trademark).

The electronic equipment 3 is an information processing device of a notebook personal computer type and has a display 10, a keyboard 11, and a touchpad 12 as illustrated in FIG. 1. Hereinafter, as illustrated in FIG. 1, a lateral direction of the electronic equipment 3 as viewed from the user will be referred to as an x-direction, a depth direction will be referred to as a y-direction, and a height direction will be referred to as a z-direction.

Figure 2:
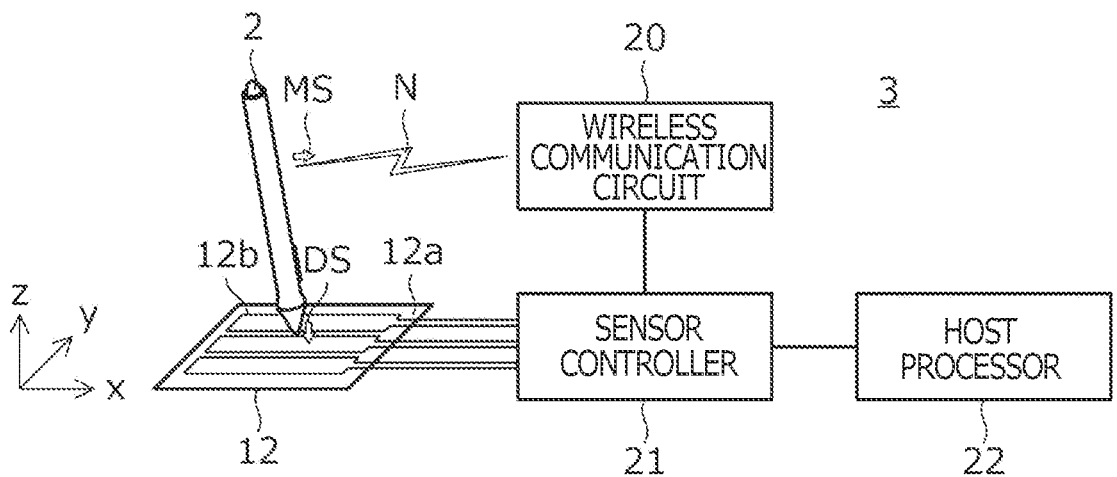
FIG. 2 is a diagram illustrating an internal configuration of electronic equipment illustrated in FIG. 1.

FIG. 2 is a diagram illustrating an internal configuration of the electronic equipment 3. The pen-shaped device 2 is also illustrated in this diagram. As illustrated in this diagram, the electronic equipment 3 further has a wireless communication circuit 20, a sensor controller 21, and a host processor 22 in addition to the above-described components. The configuration of the electronic equipment 3 will be described in detail below with reference to FIG. 1 and FIG. 2.

The display 10 is a display device having a display screen, such as a liquid crystal display or an organic electroluminescence (EL) display, for example, and plays a role in visually outputting characters and figures. The keyboard 11 and the touchpad 12 are input devices for allowing the user to execute input to the electronic equipment 3. As illustrated in FIG. 2, the touchpad 12 includes the touch surface 12a that is a flat surface and a plurality of loop coils 12b disposed in the touch surface 12a.

As illustrated in FIG. 1, the touch surface 12a is configured to be substantially flush with a surface 3a of the electronic equipment 3 that ranges around the touch surface 12a. This makes it possible to move the pen tip of the pen-shaped device 2 across a boundary between the touch surface 12a and the surface 3a in the electronic equipment 3 as exemplified by an arrow A in FIG. 1.

The plurality of loop coils 12b configure a sensor for detecting the downlink signal DS transmitted by the pen-shaped device 2. While only three loop coils 12b extending in the x-direction are illustrated in FIG. 2, the actual touchpad 12 has a larger number of loop coils 12b including a plurality of loop coils 12b extending in the x-direction and a plurality of loop coils 12b extending in the y-direction.

The wireless communication circuit 20 is a device having a function of communicating with another device by the short-range wireless communication N. The wireless communication circuit 20 according to the present embodiment is connected to the sensor controller 21 and executes the short-range wireless communication N with the pen-shaped device 2 according to control from the sensor controller 21.

The sensor controller 21 is an integrated circuit configuring a coordinate output device that outputs, to the host processor 22, the absolute coordinates indicating the position of the pen tip in the touch surface 12a or the relative coordinates indicating change in the position of the pen tip, according to the position indicated by the pen-shaped device 2. In one or more implementations, the sensor controller 21 includes at least one processor and at least one memory storing instructions that, when executed by the at least one processor, cause the sensor controller 21 to perform the acts described herein. The sensor controller 21 selectively outputs either one of the absolute coordinates and the relative coordinates. Acquisition of the absolute coordinates by the sensor controller 21 is executed by what is generally called an electromagnetic induction system. On the other hand, acquisition of the relative coordinates by the sensor controller 21 is executed by receiving the mouse signal MS from the pen-shaped device 2 through the wireless communication circuit 20.

The acquisition of the absolute coordinates by the electromagnetic induction system will be specifically described. The sensor controller 21 detects the absolute coordinates indicating the position of the pen tip in the touch surface 12a by receiving, by each of the plurality of loop coils 12b, the downlink signal DS transmitted by the pen-shaped device 2. More specifically, the sensor controller 21 detects a reception intensity of the downlink signal DS at each of the plurality of loop coils 12b and derive the absolute coordinates indicating the position of the pen tip on the basis of distribution of the reception intensity.

The sensor controller 21 also executes processing of demodulating the downlink signal DS to acquire data transmitted by the pen-shaped device 2. The data transmitted by the pen-shaped device 2 in the form of the downlink signal DS can include a writing pressure value indicating a pressure detected by a pressure sensor 42 (see FIG. 3) to be described later, battery remaining level information indicating the remaining level of a battery 44 (see FIG. 3) to be described later, and so forth.

The sensor controller 21 continues to output the relative coordinates to the host processor 22 while the absolute coordinates are not acquired. Meanwhile, the sensor controller 21 starts output of the absolute coordinates to the host processor 22 and stops the output of the relative coordinates to the host processor 22 in response to acquisition of the absolute coordinates (that is, movement of the pen-shaped device 2 from an inside of the surface 3a to an inside of the touch surface 12a). By employing such a configuration for the sensor controller 21, according to the present embodiment, implementing input of stroke data by the pen-shaped mouse with high accuracy is enabled. Details about this point will be described in more detail later with reference to FIG. 4 and FIG. 5.

The host processor 22 is a central processing unit of the electronic equipment 3 and executes an operating system of the electronic equipment 3 including a driver of the sensor controller 21 and various applications including a drawing application that executes generation and rendering of digital ink, by executing a program stored in a memory that is not illustrated.

The driver of the sensor controller 21 is a program having a function of accumulating, as a writing log in the memory, the absolute coordinates sequentially supplied from the sensor controller 21. The driver of the sensor controller 21 accumulates also the above-described writing pressure value and battery remaining level information in the writing log in such a manner as to associate them with the absolute coordinates.

The drawing application is a program having a function of executing generation and rendering of digital ink on the basis of the writing log generated by the driver of the sensor controller 21. Specifically, the drawing application implements processing of generating stroke data on the basis of a series of the absolute coordinates included in the writing log and executing rendering of the generated stroke data on the basis of at least one of a series of the writing pressure value and a series of the battery remaining level information included in the writing log. Rendering based on the writing pressure value includes processing of making the width of a drawn line larger when the writing pressure value is larger. Further, rendering based on the battery remaining level information includes processing of making the drawing color lighter when the remaining level of the battery 44 is lower.

Next, a configuration of the pen-shaped device 2 will specifically be described. FIG. 3 is a schematic diagram illustrating a cross section of a vicinity of the pen tip of the pen-shaped device 2. As illustrated in this diagram, the pen-shaped device 2 has a relative coordinate detecting device 30, a signal transmitter circuit 40, a core body 41, the pressure sensor 42, a wireless communication circuit 43, the battery 44, and a signal processing circuit 45.

The relative coordinate detecting device 30 is an optical device that detects the relative coordinates indicating change in the position of the pen tip, and includes frames 31 to 33, a plurality of light sources 34, an image sensor 35, and a waveguide component 36. While an example in which the relative coordinate detecting device 30 is configured by the optical device is described here, the relative coordinate detecting device 30 may be configured by another kind of device such as a ball-system sensor or a gyro.

The frames 31 to 33 are each a component having a shape rotationally symmetric around a pen axis and are disposed in the pen-shaped device 2 in the state in which they are mutually fixed. Meanwhile, the frames 31 to 33 are not fixed to a casing of the pen-shaped device 2 and are capable of slightly moving in a pen axis direction. By this movement, the frames 31 to 33 play a role in transmitting, to the core body 41, the pressure applied from the surface 3a or the touch surface 12a (hereinafter referred to collectively as a "reading surface") to the pen tip (specifically, surface of a first lens 36a to be described later).

The frame 31 is a component that configures an upper surface of the relative coordinate detecting device 30. One end of the core body 41 is fixed to the upper surface of the frame 31, and each light source 34 and the image sensor 35 are fixed to a lower surface of the frame 31.

The frame 32 is a guide that limits an optical path of light that has been emitted from each light source 34 and been reflected by the reading surface (hereinafter referred to as "reflected light"). At the center of the frame 32, an opening part 32a formed to have a diameter smaller than that of an opening part 33a to be described later is made. The opening part 32a has a role as an aperture that blocks part of the reflected light that has passed through the opening part 33a and entered the pen-shaped device 2.

The frame 33 is a component for fixing the waveguide component 36 and has the opening part 33a at its center. The waveguide component 36 is fixed to a lower surface of the frame 33 in such a state as to cover the whole of the opening part 33a. The opening part 33a plays a role in guiding the light from the light sources 34 in a direction toward the waveguide component 36 and guiding the reflected light that has passed through the waveguide component 36 in a direction toward the frame 32.

The plurality of light sources 34 are each a device having a function of executing irradiation with light and are disposed at equal intervals along a circumference of a circle that is centered at the image sensor 35 and that has a predetermined radius. The kind of each light source 34 is not particularly limited and may be any of red light emitting diode (LED), blue LED, infrared LED, and laser, for example.

The image sensor 35 is an image part that generates imaging data by shooting or imaging the reflected light that has passed through the opening part 32a, and is disposed at a position at which the pen axis penetrates through the center of the image sensor 35. The imaging data generated by the image sensor 35 is sequentially supplied to the signal processing circuit 45.

The waveguide component 36 is a component having a function of diffusing the light emitted from each light source 34 to the vicinity of the pen tip and a function of guiding the reflected light of the light emitted from the light sources 34 to the image sensor 35. As illustrated in FIG. 3, the waveguide component 36 has a structure obtained by integrally forming the first lens 36a and a second lens 36b each having a shape rotationally symmetric around the pen axis.

The second lens 36b is a lens formed to have a size that allows covering of the whole of the opening part 33a, and is fixed to the lower surface of the frame 33 in such a state as to cover the whole of the opening part 33a. The light that has been emitted from each light source 34 and passed through the opening part 33a passes through the second lens 36b and is applied to the reading surface. The specific shape of the second lens 36b is designed in such a manner that the light from each light source 34 can be diffused to the vicinity of the pen tip without being converged on one point as illustrated in FIG. 3. This makes it possible to irradiate the whole of a focusing range of the first lens 36a with the light from each light source 34.

The first lens 36a is a lens with a diameter smaller than that of the second lens 36b and is fixed to a lower surface of the second lens 36b. The first lens 36a plays a role in enlarging an imaging range of the image sensor 35 by focusing the light reflected by the reading surface. The reflected light incident on the first lens 36a passes through the second lens 36b, the opening part 33a, and the opening part 32a and reaches the image sensor 35. An optical fiber extending from an upper surface of the first lens 36a to the image sensor 35 may be disposed, and the light incident on the first lens 36a may be guided to the image sensor 35 by this optical fiber.

The signal transmitter 40 is a component that transmits the downlink signal DS generated by the signal processing circuit 45. Specifically, the signal transmitter 40 is configured by a coil that generates an alternating magnetic field indicating the downlink signal DS.

The core body 41 is a bar-shaped component disposed along the pen axis, and is fixed to the upper surface of the frame 31 at one end thereof and abuts against the pressure sensor 42 at the other end thereof. The core body 41 is also movable in the pen axis direction similarly to the frames 31 to 33. When the frames 31 to 33 move in the pen axis direction due to the pressure applied to the pen tip, the core body 41 also moves in the pen axis direction. The core body 41 plays a role in transmitting the pressure applied to the pen tip to the pressure sensor 42 by this movement. Further, the core body 41 passes through an inside of the coil that configures the signal transmitter 40, and also has a role as a magnetic core of the coil.

The pressure sensor 42 is a sensor that detects the pressure transmitted through the frames 31 to 33 and the core body 41. The pressure sensor 42 supplies the writing pressure value indicating the detected pressure to the signal processing circuit 45.

The wireless communication circuit 43 is a device having a function of communicating with another device by the short-range wireless communication N illustrated in FIG. 1 and FIG. 2. The wireless communication circuit 43 is connected to the signal processing circuit 45 and executes the short-range wireless communication N with the electronic equipment 3 according to control from the signal processing circuit 45.

The battery 44 is a secondary battery configured to be rechargeable externally or a primary battery configured to be replaceable by the user and plays a role in supplying operating power to the respective parts in the pen-shaped device 2 including each light source 34, the image sensor 35, the wireless communication circuit 43, and the signal processing circuit 45. The signal processing circuit 45 is capable of acquiring the remaining level of the battery 44.

The signal processing circuit 45 is an integrated circuit that executes various kinds of signal processing, and is connected to each light source 34, the image sensor 35, the pressure sensor 42, the wireless communication circuit 43, and the battery 44. Regarding the relative coordinates, the signal processing circuit 45 executes processing of causing the image sensor 35 to execute continuous shooting in the state in which each light source 34 is caused to emit light and deriving the relative coordinates indicating change in the position of the pen tip on the basis of the movement amount of a pattern included in imaging data obtained as the result of the continuous shooting, processing of generating the mouse signal MS indicating the derived relative coordinates, and processing of transmitting the generated mouse signal MS by the short-range wireless communication N through the wireless communication circuit 43. Moreover, regarding the absolute coordinates, the signal processing circuit 45 executes processing of generating the downlink signal DS by modulating a carrier signal with use of pieces of data such as the writing pressure value supplied from the pressure sensor 42 and the battery remaining level information indicating the remaining level of the battery 44 and processing of transmitting the generated downlink signal DS by an alternating magnetic field through the signal transmitter circuit 40.

Figure 4:
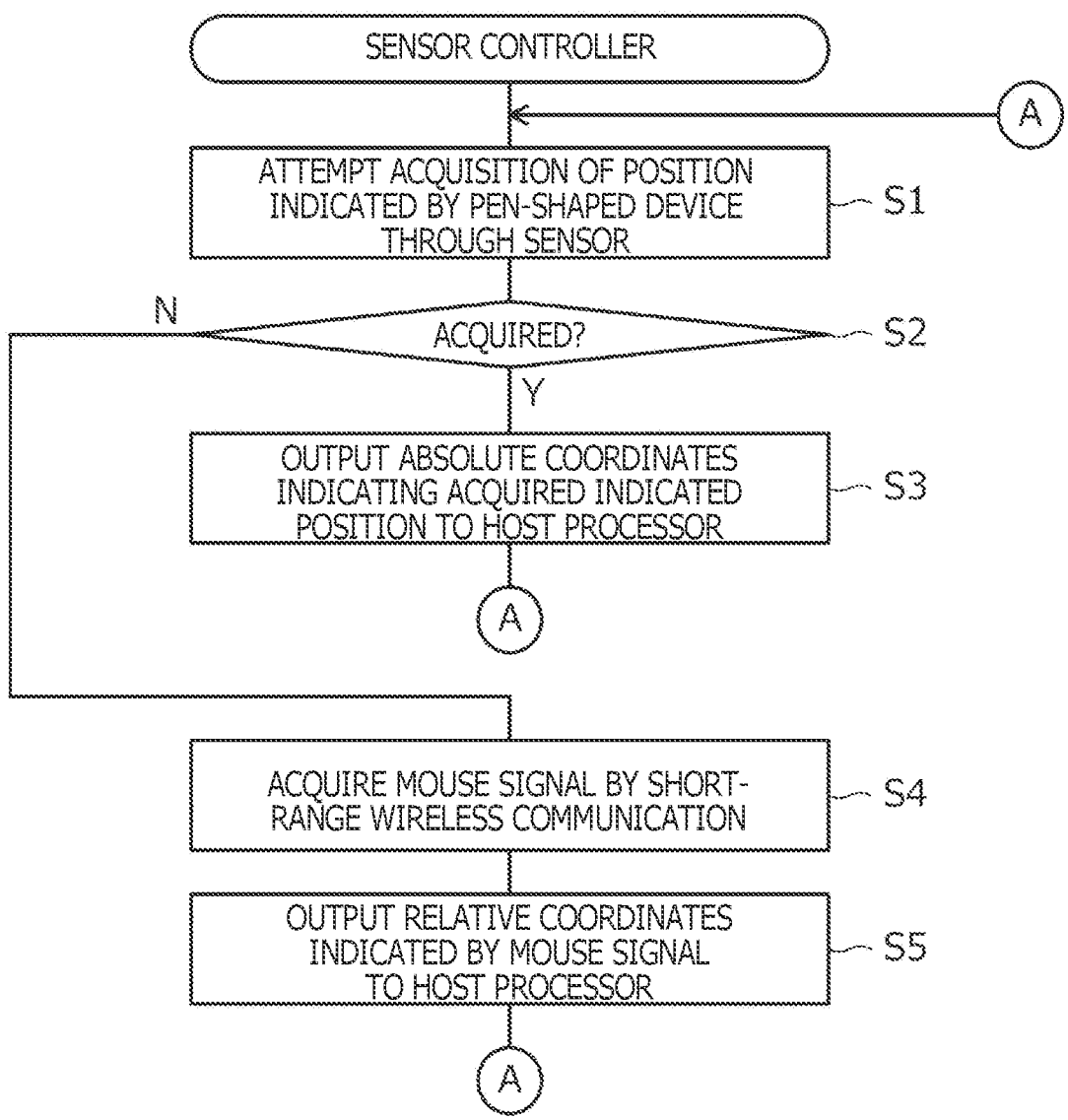
FIG. 4 is a processing flowchart illustrating processing executed by a sensor controller illustrated in FIG. 2.
Figure 5:
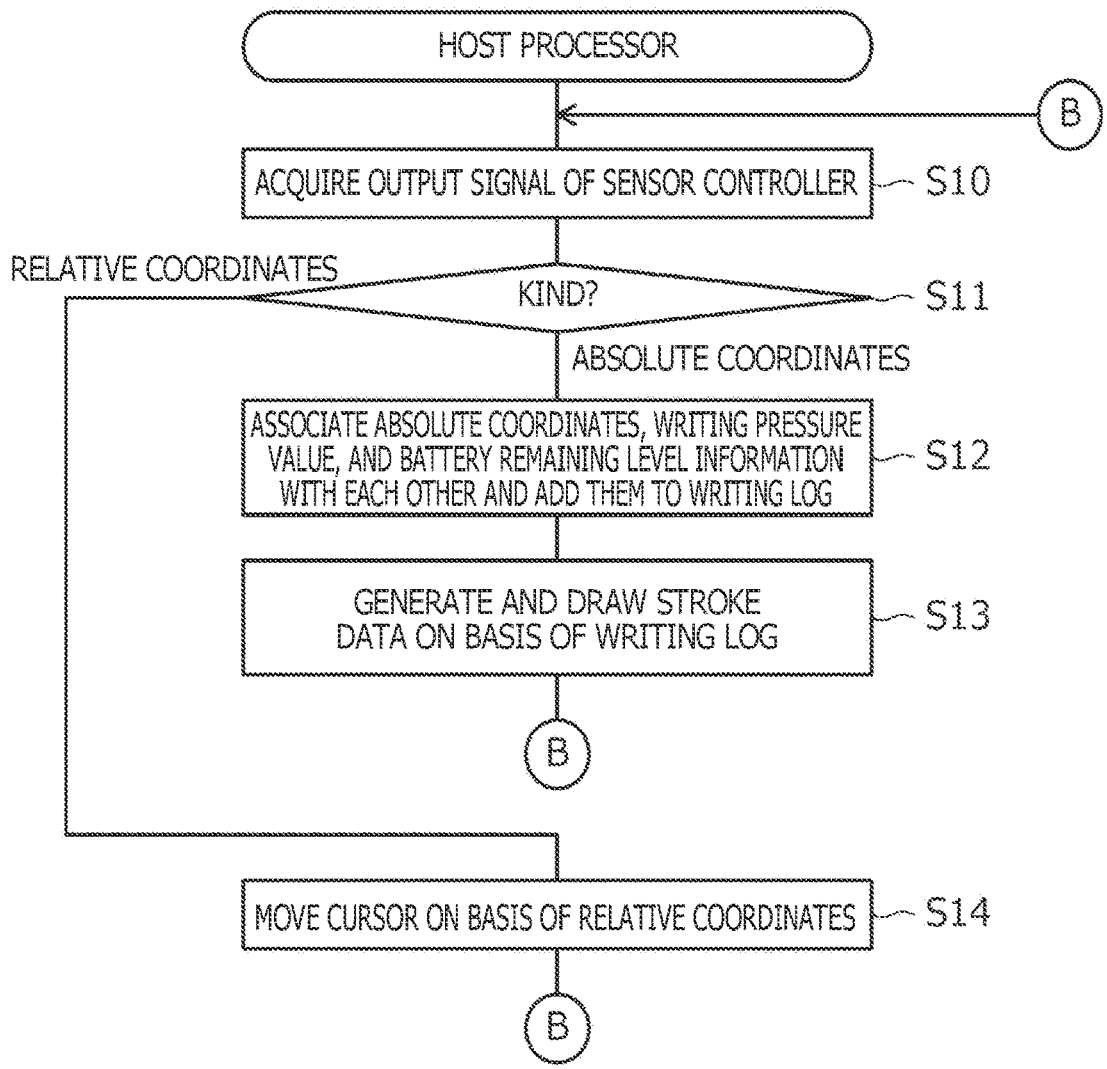
FIG. 5 is a processing flowchart illustrating processing executed by a host processor illustrated in FIG. 2.

FIG. 4 is a processing flowchart illustrating processing executed by the sensor controller 21 illustrated in FIG. 2. Further, FIG. 5 is a processing flowchart illustrating processing executed by the host processor 22 illustrated in FIG. 2. In the following, with reference to these diagrams, the processing executed by the sensor controller 21 and the host processor 22 will be described in detail.

With reference first to FIG. 4, the sensor controller 21 attempts acquisition of the position indicated by the pen-shaped device 2, through the plurality of loop coils 12b disposed in the touchpad 12 (S1). This acquisition is acquisition by the above-described electromagnetic induction system, and the acquired indicated position represents the absolute coordinates. Next, the sensor controller 21 determines whether or not the indicated position has been acquired in S1 (S2). When determining that the indicated position has been acquired, the sensor controller 21 outputs the absolute coordinates indicating the acquired indicated position to the host processor 22 (S3) and returns the processing to S1.

On the other hand, the sensor controller 21 in the case in which it has determined that the indicated position has not been acquired in S2 acquires the mouse signal MS transmitted by the pen-shaped device 2, by the short-range wireless communication N (S4). Then, the sensor controller 21 outputs the relative coordinates indicated by the acquired mouse signal MS to the host processor 22 (S5) and returns the processing to S1.

With reference next to FIG. 5, the host processor 22 acquires an output signal of the sensor controller 21 (S10) and determines the kind thereof (S11). Then, when determining that the output signal is a signal including the absolute coordinates, the host processor 22 associates the absolute coordinates, the writing pressure value, and the battery remaining level information included in the acquired output signal with each other and adds them to the writing log (S12). Subsequently, the host processor 22 executes generation and drawing (rendering) of stroke data on the basis of each series of the absolute coordinates, the writing pressure value, and the battery remaining level information accumulated in the writing log (S13) and returns the processing to S10. In S13, the host processor 22 executes the rendering of the stroke data in such a manner that the drawing color of the stroke data becomes lighter when the remaining level of the battery 44 indicated by the battery remaining level information included in the writing log is lower.

On the other hand, the host processor 22 that has determined that the output signal is a signal including the relative coordinates in S11 moves a cursor on the basis of the relative coordinates indicated by the acquired output signal (S14) and returns the processing to S10.

As described above, with the sensor controller 21 and the pen-shaped device 2 according to the present embodiment, from the sensor controller 21 to the host processor 22, the absolute coordinates are output when the position indicated by the pen-shaped device 2 exists in the touch surface 12*a* whereas the relative coordinates can be output when the position exists outside the touch surface 12*a*. Therefore, while input of stroke data not by the mouse signal MS but by the electromagnetic induction system is executed in the touch surface 12*a*, input by the mouse signal MS can be executed outside the touch surface 12*a*. Hence, it is possible to implement input of stroke data by the pen-shaped mouse with high accuracy.

Further, with the pen-shaped device 2 according to the present embodiment, the waveguide component 36 is configured to diffuse the light emitted from the light sources 34 to the vicinity of the pen tip. Hence, it is possible to implement a wide imaging range while configuring the waveguides of forward and return paths with a common lens.

Moreover, with the electronic equipment 3 according to the present embodiment, the remaining level of the battery 44 can be reflected in the rendering result of stroke data. Hence, it is possible to notify the user of the remaining level of the battery 44 by a method that allows the user to perceive the remaining level more easily.

The preferred embodiment of the present disclosure has been described above. However, it is obvious that the present disclosure is not limited to such an embodiment at all and the present disclosure can be carried out in various forms without departing from the gist thereof.

Figure 6:
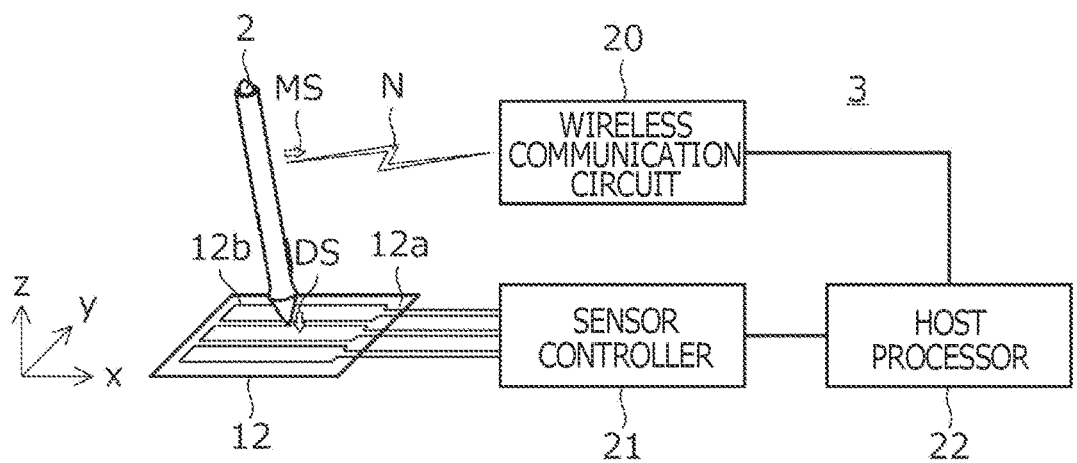
FIG. 6 is a diagram illustrating an internal configuration of the electronic equipment according to a modification example of the embodiment of the present disclosure.

FIG. 6 is a diagram illustrating an internal configuration of the electronic equipment 3 according to a modification example of the above-described embodiment. The present modification example is different from the above-described embodiment in that the wireless communication circuit 20 is connected not to the sensor controller 21 but to the host processor 22. In this case, the sensor controller 21 executes only processing relating to the absolute coordinates, and the host processor 22 executes processing as the above-described coordinate output device. Specifically, the host processor 22 determines whether or not an output signal of the sensor controller 21 has been acquired. When the output signal has not been acquired, the host processor 22 outputs the relative coordinates indicated by the mouse signal MS acquired through the wireless communication circuit 20 to the operating system or an application. On the other hand, when the output signal has been acquired, the host processor 22 outputs the absolute coordinates included in the output signal of the sensor controller 21 to the operating system or an application. Configuring the sensor controller 21 and the host processor 22 in this manner makes it possible to obtain effects similar to those of the above-described embodiment also in the present modification example.

Further, in the above-described embodiment, description has been made by taking as an example the case in which the pen-shaped device 2 moves from the inside of the surface 3*a* to the inside of the touch surface 12*a*. However, the present disclosure can widely be applied to the cases in which the pen-shaped device 2 moves from a surface that is not relevant to input of the absolute coordinates to a surface relevant to input of the absolute coordinates. For example, the present disclosure can also be applied to the case in which part of a mouse pad is set as a surface relevant to input of the absolute coordinates (touch surface) and the pen-shaped device 2 moves from the outside of this touch surface to the inside thereof.

Moreover, in the above-described embodiment, the example in which the pen-shaped device 2 transmits the downlink signal DS by using power of the battery 44 has been described. However, the pen-shaped device 2 and the sensor controller 21 may be configured to transmit the downlink signal DS by using power acquired by a magnetic field generated in the loop coils 12*b*. The sensor controller 21 in this case executes processing of causing a current to flow in the loop coils 12*b* to generate the magnetic field. Further, the pen-shaped device 2 has a resonant circuit including a coil and a capacitor, stores in the capacitor the power generated by the magnetic field generated in the loop coils 12*b*, and transmits the downlink signal DS from the coil by using the power stored in the capacitor. Moreover, the pen-shaped device 2, the touchpad 12, and the sensor controller 21 may be configured to detect the absolute coordinates of the pen-shaped device 2 by an active capacitive system.

Further, in the above-described embodiment, the example in which the touchpad 12 is used for input of the absolute coordinates by the pen-shaped device 2 has been described. However, it is also possible to configure the touchpad 12 in such a manner that touch input by a finger can also be executed. It is preferable that detection of a finger in this case be implemented by the capacitive system.

Moreover, the touchpad 12 may have a function of detecting click operation. Specifically, detection of click operation may be implemented by detecting tap operation of the touch surface 12*a* by a pressure sensor that is not illustrated (pressure pad). Alternatively, a press button switch may be disposed on a lower side of the touch surface 12*a*, and click operation may be detected when the touch surface 12*a* itself is displaced downward in response to pressing-down thereof by a user and the press button switch is thus pressed down by the touch surface 12*a* (click pad). Alternatively, a button for click may separately be disposed near the touch surface 12*a*, and click operation may be detected through pressing-down of the button.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A coordinate output device, comprising:
    at least one processor; and
    at least one memory storing instructions that, when executed by the at least one processor, cause the coordinate output device to:
        output absolute coordinates indicating a position in a predetermined region or relative coordinates, according to a position indicated by a position indicator, wherein the relative coordinates are data indicating change in the position of the position indicator acquired through a wireless communication circuit that, in operation, communicates wirelessly, and
        continue to output the relative coordinates while the absolute coordinates are not acquired, and start output of the absolute coordinates and stop output of the relative coordinates in response to acquisition of the absolute coordinates.

2. The coordinate output device according to claim 1, wherein:
    the absolute coordinates are data indicating the position of the position indicator acquired through a sensor disposed in the predetermined region.

3. The coordinate output device according to claim 1, wherein:
    the coordinate output device selectively outputs either one of the absolute coordinates and the relative coordinates.

4. The coordinate output device according to claim 1, wherein:
    the coordinate output device is connected to a sensor disposed in the predetermined region and a wireless communication circuit that, in operation, communicates wirelessly, and
    the coordinate output device, in operation, acquires the absolute coordinates through the sensor and acquires the relative coordinates from a signal received by the wireless communication circuit.

5. The coordinate output device according to claim 1, wherein:
    the coordinate output device is connected to a sensor controller that acquires the absolute coordinates through a sensor disposed in the predetermined region, and is connected to a wireless communication, in operation, communicates wirelessly, and
    the coordinate output device, in operation, acquires the absolute coordinates from the sensor controller and acquires the relative coordinates from a signal received by a wireless communication circuit.

6. A pen-shaped device having a pen tip, the pen-shaped device comprising:
    a relative coordinate detecting device that, in operation, detects relative coordinates indicating change in a position of the pen tip; and
    a signal transmitter circuit that, in operation, transmits a signal usable to detect absolute coordinates of the pen tip in a predetermined region, wherein the signal transmitter circuit includes a coil that, in operation, transmits the signal by an alternating magnetic field.

7. The pen-shaped device according to claim 6, wherein:
    the relative coordinate detecting device includes an optical device including a light source that, in operation, emits light and an imaging part that, in operation, images reflected light of the light emitted from the light source.

8. The pen-shaped device according to claim 7, wherein:
    the optical device includes a waveguide component that, in operation, diffuses the light to a vicinity of the pen tip and guides the reflected light to the imaging part.

9. The pen-shaped device according to claim 8, wherein:
    the waveguide component has a first lens that, in operation, enlarges an imaging range of the imaging part.

10. The pen-shaped device according to claim 9, wherein:
    the waveguide component has a second lens that that, in operation, diffuses the light emitted from the light source to the vicinity of the pen tip.

11. An electronic device used together with a pen-shaped device having a pen tip, the pen-shaped device including a relative coordinate detecting device that detects relative coordinates indicating change in a position of the pen tip and a signal transmitter that transmits a signal used for detection of absolute coordinates of the pen tip in a predetermined region, the electronic device comprising:
    at least one processor; and
    at least one memory storing instructions that, when executed by the at least one processor, cause the electronic device to:
        acquire the absolute coordinates indicating a position of the pen-shaped device in the predetermined region by use of the signal transmitted from the signal transmitter,
        receive the relative coordinates from the pen-shaped device by wireless communication, and
        add the absolute coordinates to a writing log, wherein the electronic device does not add the relative coordinates to the writing log.

12. The electronic device according to claim 11, wherein;
    the instructions, when executed by the at least one processor, cause the electronic device to generate and render stroke data based on the writing log.

13. The electronic device according to claim 12, wherein;
    the signal transmitted from the signal transmitter includes battery remaining level information indicating a remaining level of a battery incorporated in the pen-shaped device,
    the instructions, when executed by the at least one processor, cause the electronic device to add the battery remaining level information to the writing log together with the absolute coordinates, and
    the instructions, when executed by the at least one processor, cause the electronic device to generate the stroke data based on a series of the absolute coordinates included in the writing log and render the stroke data based on a series of the battery remaining level information included in the writing log.

14. The electronic device according to claim 13, wherein;
    the instructions, when executed by the at least one processor, cause the electronic device to render the stroke data such that a drawing color becomes lighter when the remaining level of the battery indicated by the battery remaining level information decreases.

* * * * *